(12) United States Patent
Yasumatsuya et al.

(10) Patent No.: US 6,846,276 B2
(45) Date of Patent: Jan. 25, 2005

(54) METHOD AND APPARATUS FOR CONTROLLING TOOL CHANGER

(75) Inventors: Kaoru Yasumatsuya, Yamatokoriyama (JP); Takashi Okuda, Yamatokoriyama (JP)

(73) Assignee: Mori Seiki Co., Ltd., Nara (JP)

( * ) Notice: Subject to any disclaimer, the term of this patent is extended or adjusted under 35 U.S.C. 154(b) by 53 days.

(21) Appl. No.: 10/034,097

(22) Filed: Jan. 3, 2002

(65) Prior Publication Data

US 2002/0094920 A1 Jul. 18, 2002

(30) Foreign Application Priority Data

Jan. 16, 2001 (JP) ........................................ 2001-007451

(51) Int. Cl.$^7$ .............................................. B23Q 3/155
(52) U.S. Cl. ............................. 483/1; 483/39; 483/40; 483/41
(58) Field of Search ............................... 483/1, 39, 40, 483/41, 36, 38, 44, 45, 46, 47, 48, 57

(56) References Cited

U.S. PATENT DOCUMENTS

| | | | | |
|---|---|---|---|---|
| 3,932,924 A | * | 1/1976 | Anderson ....................... | 483/1 |
| 4,288,192 A | * | 9/1981 | Geiger et al. ................. | 483/44 |
| 4,306,350 A | * | 12/1981 | Kielma et al. ................. | 483/1 |
| 5,134,767 A | * | 8/1992 | Yasuda .......................... | 483/7 |
| 5,188,579 A | * | 2/1993 | Ruschle et al. ................ | 583/1 |
| 5,439,434 A | * | 8/1995 | Sato et al. ..................... | 483/1 |
| 5,669,866 A | * | 9/1997 | Julian et al. ................... | 483/1 |
| 5,908,374 A | * | 6/1999 | Kato ............................. | 483/1 |
| 5,913,760 A | * | 6/1999 | Kamada et al. ................ | 483/1 |

FOREIGN PATENT DOCUMENTS

JP      3-035953      2/1991

* cited by examiner

*Primary Examiner*—A. L. Wellington
*Assistant Examiner*—Dana Ross
(74) *Attorney, Agent, or Firm*—Westerman, Hattori, Daniels & Adrian, LLP

(57) ABSTRACT

The present invention relates a tool changer controlling method and apparatus, which can reduce a tool changing time as compared with the prior art. The controlling apparatus controls operation of a tool changer (1) which comprises a changer arm (2) for holding tools (Ta,Tb) and is adapted to pivot the changer arm (2) by a driving system including a servo motor (5) and exchange the tool (Ta) attached to a main spindle (20) in a tool changing position and the tool (Tb) in a predetermined position. The servo motor (5) is driven and controlled so that the changer arm (2) is preliminarily pivoted by a predetermined angle when the main spindle (20) is moved to the tool changing position, and further pivoted to the tool changing position after the main spindle (20) reaches the tool changing position.

2 Claims, 3 Drawing Sheets

METHOD AND APPARATUS FOR CONTROLLING TOOL CHANGER

BACKGROUND OF THE INVENTION

1. Field of the Invention

The present invention relates to a method and apparatus for controlling a tool changer which comprises a changer arm for holding tools and is adapted to pivot the changer arm by a driving system including a servo motor to exchange a tool attached to a main spindle and a tool located in a predetermined position.

2. Description of the Prior Art

Tool changers employed for machine tools generally include a changer arm for holding tools, a rotation shaft connected to the changer arm in an orthogonal relation, driving means for axially moving the rotation shaft and rotating the rotation shaft about the axis thereof, and the like. In such a tool changer, the changer arm is moved axially of the rotation shaft and pivoted about the rotation shaft, and a tool attached to a main spindle and a tool located in a predetermined position are exchanged by such combined movement of the changer arm.

An electric motor (driving motor) is conventionally employed at least for the rotation of the rotation shaft. After the main spindle is moved to a tool changing position, the driving motor is driven and controlled so that the rotation shaft is rotated to pivot the changer arm.

In the field of machine tools, attempts are constantly made to reduce operation times of respective operating mechanisms to reduce a machining time for reduction of machining costs. The tool changer is also unexceptional, and an attempt is made to reduce the time required for tool change. Where the tool change is frequently carried out for machining, the tool changing time accounts for a great proportion of the total machining time. Therefore, the reduction in the tool changing time is imperative.

In view of the foregoing, the inventor of the present invention have conducted intensive studies to further reduce the tool changing time, and attained the present invention. It is therefore an object of the present invention to provide a tool changer controlling method and apparatus which can further reduce the tool changing time as compared with the prior art.

SUMMARY OF THE INVENTION

In accordance with the present invention to achieve the aforesaid object, there is provided a method for controlling a tool changer which comprises a changer arm having a spindle tool holder for holding a tool attached to a main spindle and a standby tool holder for holding a tool to be next attached to the main spindle for tool change and is adapted to pivot the changer arm by a driving system including a servo motor to exchange the tool attached to the main spindle in a tool changing position and the next tool in a predetermined position, the method comprising the steps of: preliminarily pivoting the changer arm by a predetermined angle when the main spindle is moved to the tool changing position; further pivoting the changer arm so as to move the spindle tool holder of the changer arm to the tool changing position after the main spindle reaches the tool changing position; and causing the spindle tool holder of the changer arm to hold the tool attached to the main spindle.

The aforesaid method can be implemented by an apparatus for controlling a tool changer which comprises a changer arm having a spindle tool holder for holding a tool attached to a main spindle and a standby tool holder for holding a tool to be next attached to the main spindle for tool change and is adapted to pivot the changer arm by a driving system including a servo motor to exchange the tool attached to the main spindle in a tool changing position and the next tool in a predetermined position, wherein the servo motor is driven to preliminarily pivot the changer arm by a predetermined angle when the main spindle is moved to the tool changing position, to further pivot the changer arm so as to move the spindle tool holder of the changer arm to the tool changing position after the main spindle reaches the tool changing position, and to cause the spindle tool holder of the changer arm to hold the tool attached to the main spindle.

According to the present invention, the changer arm is preliminarily pivoted by the predetermined angle when the main spindle is moved to the tool changing position and, after the main spindle reaches the tool changing position, the changer arm is further pivoted so that the spindle tool holder thereof is moved to the tool changing position. Therefore, the tool changing time can be reduced by the preliminary pivoting of the changer arm as compared with the prior-art controlling method and apparatus in which the changer arm is pivoted after the main spindle reaches the tool changing position.

Where the main spindle is located on the same side as the spindle tool holder of the changer arm with respect to a plane including a pivot axis of the changer arm and the tool changing position prior to the movement to the tool changing position, the predetermined preliminary pivot angle is preferably smaller than the predetermined preliminary pivot angle where the main spindle is located opposite from the spindle tool holder with respect to the plane prior to the movement to the tool changing position.

Where the main spindle is located on the same side as the spindle tool holder of the changer arm with respect to the plane prior to the movement to the tool changing position, there is a possibility that the main spindle interferes with the changer arm during the movement to the tool changing position if the preliminary pivot angle is set greater. Therefore, the preliminary pivot angle cannot be set excessively great. Where the main spindle is located opposite from the spindle tool holder of the changer arm with respect to the plane, on the contrary, the preliminary pivot angle may be set relatively great as long as the main spindle is prevented from interfering with the changer arm during the movement to the tool changing position.

Thus, the tool changing time can more precisely and properly be reduced by setting the preliminary pivot angle at a greatest possible level according to the position of the main spindle prior to the movement to the tool changing position.

DESCRIPTION OF THE PREFERRED EMBODIMENT

Figure 1:
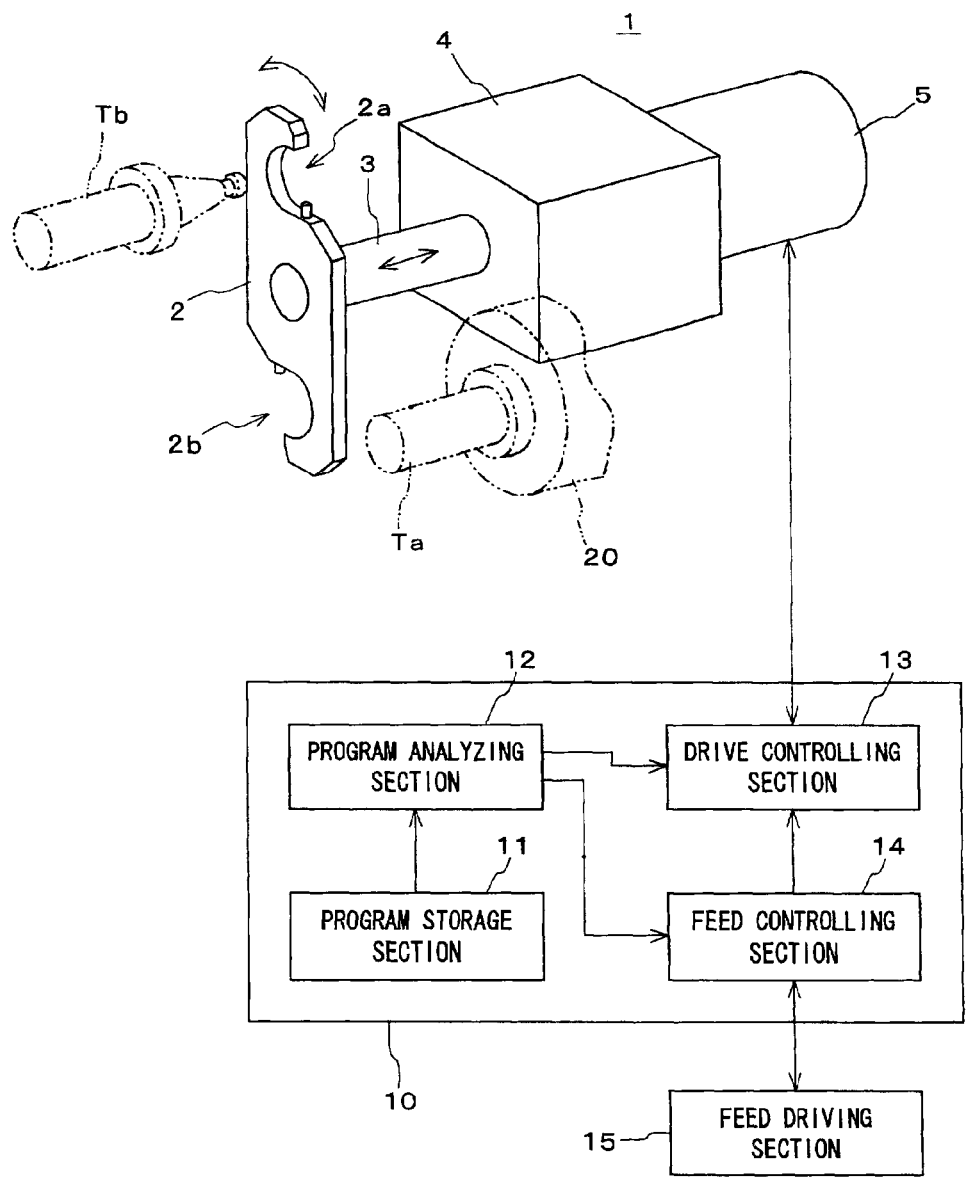
FIG. 1 is a schematic diagram schematically illustrating the construction of a tool changer and the construction of a controlling apparatus for the tool changer in accordance with one embodiment of the present invention.

A preferred embodiment of the present invention will hereinafter be described with reference to the attached drawings. FIG. 1 is a schematic diagram schematically illustrating the construction of a tool changer and the construction of a controlling apparatus for the tool changer in accordance with the embodiment.

As shown in FIG. 1, the tool changer 1 according to this embodiment includes a changer arm 2 for holding tools, a rotation shaft 3 connected to the changer arm 2 in an orthogonal relation, a driving mechanism 4 for axially moving the rotation shaft 3 and rotating the rotation shaft 3 about the axis thereof, a servo motor 5 for applying power to the driving mechanism 4, and the like. The changer arm 2 has a spindle tool holder 2a provided on one end thereof for holding a tool Ta attached to a main spindle 20, and a standby tool holder 2b provided on the other end thereof for holding a tool Tb to be next attached to the main spindle for tool change. The changer arm 2 is moved axially of the rotation shaft 3 and pivoted about the rotation shaft 3 by operations of the servo motor 5 and the driving mechanism 4. By such combined movement of the changer arm 2, the tool Ta currently attached to the main spindle 20 and the next tool Tb taken out of a tool retainer (not shown) and located in a predetermined position are respectively held by the spindle tool holder 2a and the standby tool holder 2b, and exchanged. The servo motor 5 is provided with a position detector for detecting a rotational position of its output shaft.

The controlling apparatus 10 includes a program storage section 11, a program analyzing section 12, a drive controlling section 13, a feed controlling section 14, and the like. The controlling apparatus 10 according to this embodiment serves as a part of a numerical controller of a machine tool, and only components constituting the present invention are illustrated in FIG. 1 for explanation of this embodiment.

The program storage section 11 functions to store a preliminarily generated machining program. The program analyzing section 12 analyzes the machining program stored in the program storage section 11 to extract commands on the tool change, the rotation of the main spindle and a feed rate and a feed position for a feed driving section 15 from the machining program, then transmits the extracted tool change command to the drive controlling section 13, and transmits the commands on the feed rate, the feed position and the tool change to the feed controlling section 14.

Figure 2:
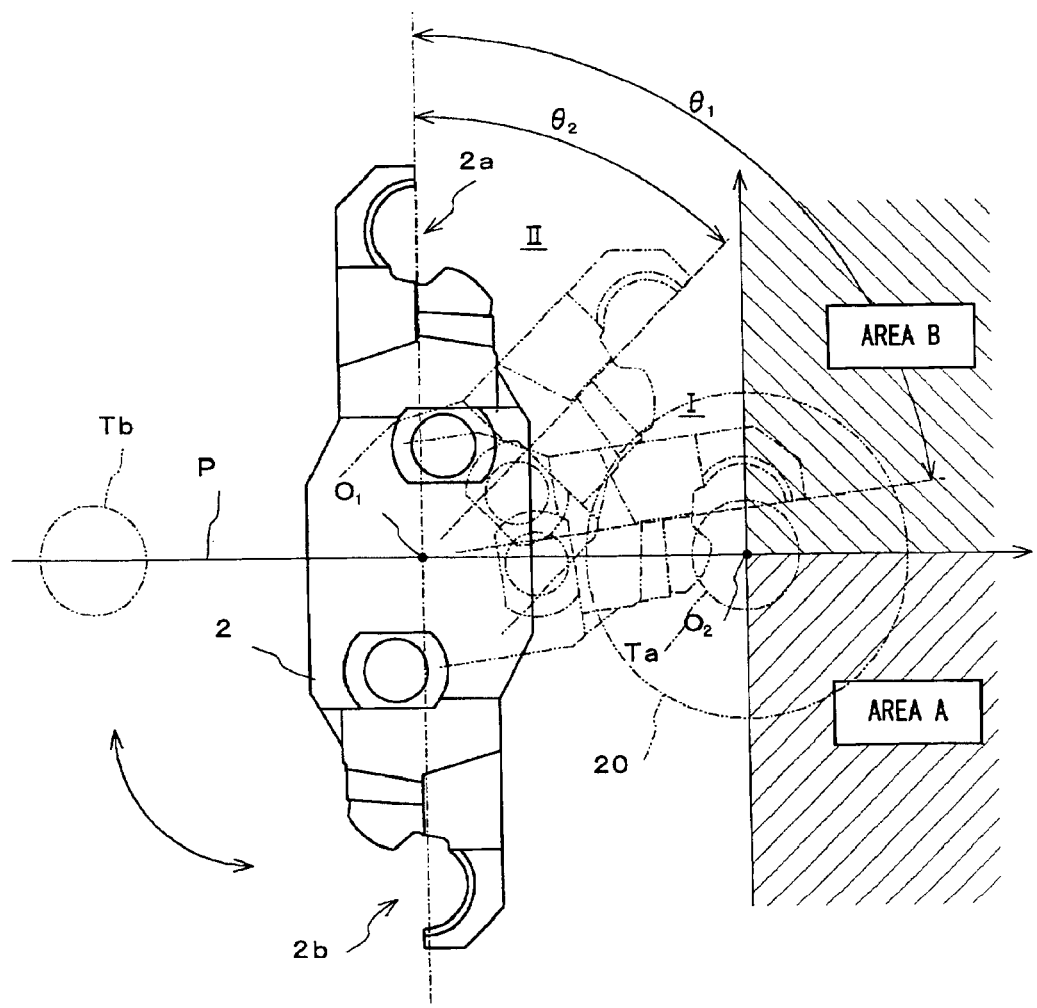
FIG. 2 is a diagram for explaining a tool changing operation according to the embodiment.

The feed controlling section 14 feedback-controls the feed driving section 15 in accordance with the commands received from the program analyzing section 12 to three-dimensionally move the main spindle 20 and a table (not shown) along three axes. Upon reception of the tool change command from the program analyzing section 12, the feed controlling section 14 moves the main spindle 20 to a tool changing position ($O_2$) as shown in FIG. 2. A signal indicative of the current position of the main spindle 20 fed back to the feed controlling section 14 from the feed driving section 15 is further transmitted to the drive controlling section 13 from the feed controlling section 14.

The drive controlling section 13 drives the servo motor 5 on the basis of the command received from the program analyzing section 12 to operate the changer arm 2 in the aforesaid manner, thereby exchanging the current tool Ta attached to the main spindle 20 and the next tool Tb taken out of the tool retainer (not shown) and located in the predetermined position.

Figure 3:
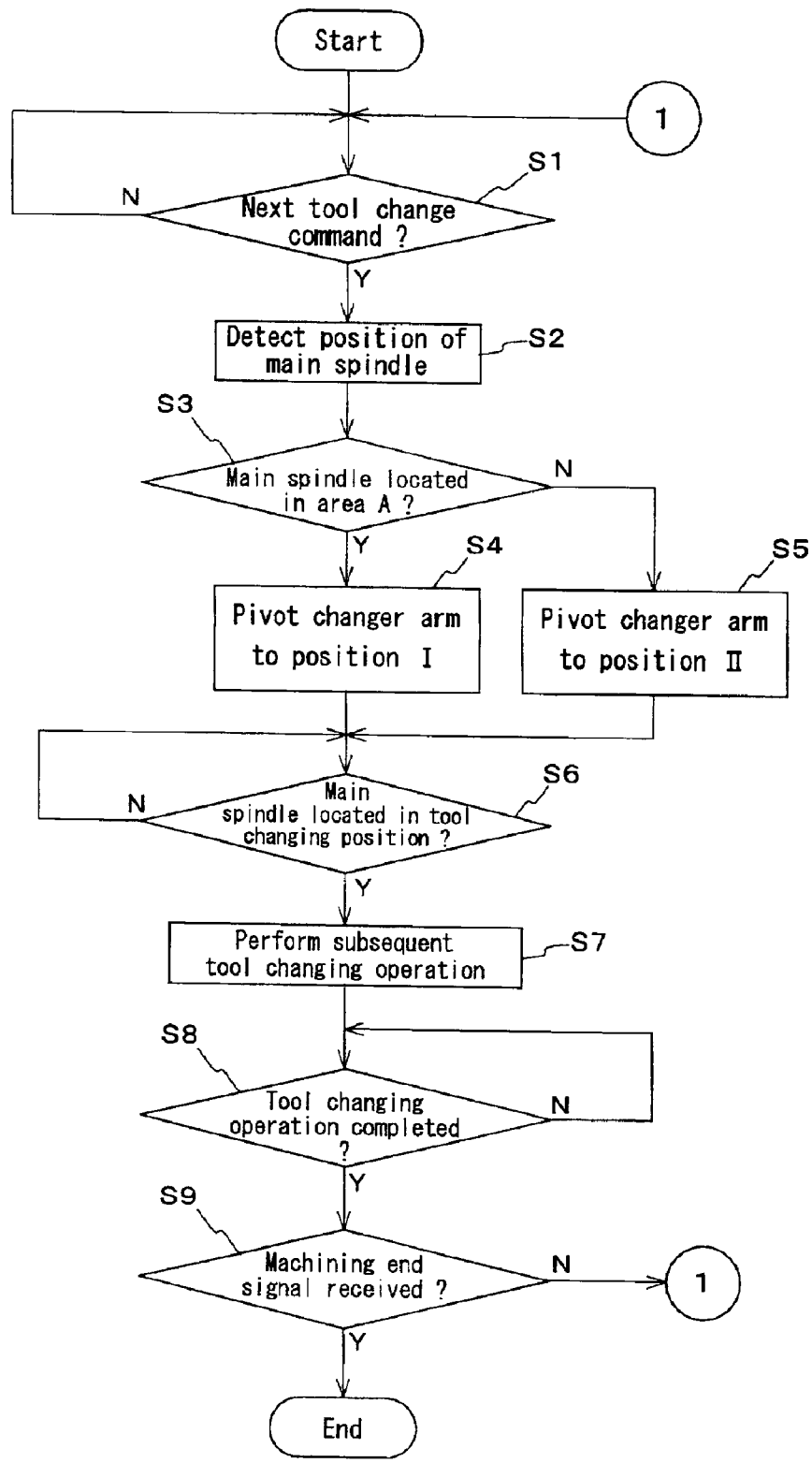
FIG. 3 is a flow chart for explaining a process sequence to be performed by a drive controlling section according to the embodiment.

More specifically, the drive controlling section 13 performs a process as shown in FIG. 3. The drive controlling section 13 checks if the tool change command is received from the program analyzing section 12 (Step S1). If the reception of the tool change command is confirmed, the drive controlling section 13 detects the position of the main spindle 20 on the basis of the signal transmitted from the feed controlling section 14 (Step S2). Then, the drive controlling section 13 judges whether the main spindle 20 is located in a area A or a area B as seen in FIG. 2 prior to the movement to the tool changing position ($O_2$) (Step S3). The areas A and B are herein defined as demarcated by a plane P (perpendicular to a sheet face of FIG. 2) including the pivot axis ($O_1$) of the changer arm 2 and the tool changing position ($O_2$). The area A is located on the side of the standby tool holder 2b for holding the next tool Tb for the tool change, while the area B is located on the side of the spindle tool holder 2a of the changer arm 2 for holding the main spindle tool (current tool) Ta.

If it is judged that the main spindle 20 is located in the area A, the changer arm 2 is preliminarily pivoted by an angle $\theta_1$ to a position I as shown in FIG. 2 (Step S4). On the other hand, if it is judged that the main spindle 20 is located in the area B, the changer arm 2 is preliminarily pivoted by an angle $\theta_2$ to a position II as shown in FIG. 2 (Step S5). The changer arm 2 assumes a state as indicated by a continuous line in FIG. 2 before a tool changing operation is started. The angles $\theta_1$ and $\theta_2$ are defined as satisfying a relation of $\theta_1 > \theta_2$.

Where the main spindle 20 is located in the area B prior to the movement to the tool changing position ($O_2$), there is a possibility that the main spindle 20 interferes with the changer arm 2 during the movement to the tool changing position ($O_2$) if the changer arm 2 is preliminarily pivoted by a greater angle, for example, to the position I. In this embodiment, therefore, the changer arm 2 is preliminarily pivoted by an angle such as to assuredly prevent the main spindle from interfering with the changer arm 2, i.e., by the angel $\theta_2$ shown in FIG. 2, when the main spindle 20 is located in the area B.

Where the main spindle is located in the area A, on the contrary, there is no possibility that the main spindle interferes with the changer arm 2 during the movement to the tool changing position ($O_2$) even if the changer arm 2 is preliminarily pivoted by a greater angle. In this embodiment, therefore, the changer arm 2 is preliminarily pivoted by the angel $\theta_1$ which is greater than the angle $\theta_2$, when the main spindle is located in the area A.

As described above, the tool change command is also transmitted to the feed controlling section 14 from the program analyzing section 12. Upon reception of the tool change command, the feed controlling section 14 moves the main spindle 20 to the tool changing position ($O_2$). Therefore, the preliminary pivoting of the changer arm 2 is carried out simultaneously with the movement of the main spindle 20 to the tool changing position ($O_2$).

After the changer arm 2 is preliminarily pivoted in the aforesaid manner, it is checked if the main spindle 20 reaches the tool changing position ($O_2$) (Step S6). If the main spindle 20 reaches the tool changing position ($O_2$), the changer arm 2 is further pivoted by a residual angle to move the spindle tool holder 2a to the tool changing position ($O_2$) (which is 90-degree apart from the initial position thereof), and the spindle tool holder 2a and the standby tool holder 2b are caused to hold the main spindle tool (current tool) Ta and the next tool Tb, respectively. Then, a subsequent tool changing operation is performed (Step S7).

After completion of the tool changing operation (Step S8), the foregoing process sequence is repeatedly performed until a machining end signal is received from the program analyzing section 12 (Step S9).

As described above in detail, the controlling apparatus 10 according to this embodiment preliminarily pivots the changer arm 2 by the predetermined preliminary pivot angle $\theta_1$ or $\theta_2$ when the main spindle 20 is moved to the tool changing position ($O_2$). Therefore, the tool changing time can be reduced by the preliminary pivoting of the changer arm 2 as compared with the prior art in which the changer arm 2 is pivoted after the movement of the main spindle 20 to the tool changing position ($O_2$).

In consideration of the interference of the main spindle 20 with the changer arm 2, the preliminary pivot angles $\theta_1$ and $\theta_2$ are each set at a greatest possible level in accordance with the position of the main spindle 20 prior to the movement to the tool changing position ($O_2$). Therefore, the tool changing time can more precisely and properly be reduced.

While the present invention has thus been described by way of the embodiment, it should be understood that the invention be not limited to this specific embodiment. In the embodiment described above, the two areas A and B are separately defined, and the preliminary pivot angles $\theta_1$ and $\theta_2$ are set for the respective areas A and B. Alternatively, a greater number of areas may be defined, and preliminary pivot angles may be set for the respective areas thus defined. With this arrangement, the tool changing time can further more precisely and properly be reduced.

What is claimed is:

1. A method for controlling a tool changer which comprises a changer arm having a spindle tool holder provided on one end thereof for holding a tool attached to a main spindle and a standby tool holder provided on the opposite end thereof for holding a tool to be next attached to the main spindle for tool change, the method comprising:

preliminarily pivoting both the spindle tool holder and the standby tool holder of the changer arm toward the tool changing position by a predetermined angle to an intermediate position before a tool changing position while the main spindle is moved to the tool changing position;

further pivoting the changer arm from said intermediate position by a residual angle in a direction of said preliminary pivoting so as to move the spindle tool holder of the changer arm to the tool changing position after the main spindle reaches the tool changing position;

causing the spindle tool holder of the changer arm to hold the tool attached to the main spindle; and wherein said preliminary pivoting pivots the changer arm to the intermediate position by a first predetermined angle when the main spindle starts moving towards the tool changing position from a first area, and pivots the changer arm to the intermediate position by a second predetermined angle smaller than the first predetermined angle when the main spindle starts moving towards the tool changing position from a second area different from the first area, the second area being closer to the spindle tool holder than the first area.

2. An apparatus for controlling a tool changer which comprises a changer arm having a spindle tool holder provided on one end thereof for holding a tool attached to a main spindle and a standby tool holder provided on the opposite end thereof for holding a tool to be next attached to the main spindle for tool change and is adapted to pivot the changer arm by a driving system including a servo motor to exchange the tool attached to the main spindle in a tool changing position and the next tool in a predetermined position, the apparatus comprising a drive controlling section for driving the servo motor to perform a changer arm pivoting control process comprising the steps of:

preliminarily pivoting both the spindle tool holder and the standby tool holder of the changer arm toward the tool changing position by a predetermined angle to an intermediate position before a tool changing position while the main spindle is moved to the tool changing position;

further pivoting the changer arm from said intermediate position by a residual angle in a direction of said preliminary pivoting so as to move the spindle tool holder of the changer arm to the tool changing position after the main spindle reaches the tool changing position;

causing the spindle tool holder of the changer arm to hold the tool attached to the main spindle wherein said preliminary pivoting pivots the changer arm to the intermediate position by a first predetermined angle when the main spindle starts moving towards the tool changing position from a first area, and pivots the changer arm to the intermediate position by a second predetermined angle smaller than the first predetermined angle when the main spindle starts moving towards the tool changing position from a second area different from the first area, the second area being closer to the spindle tool holder than the first area.

* * * * *